(12) United States Patent
Bobrov

(10) Patent No.: US 7,108,749 B2
(45) Date of Patent: Sep. 19, 2006

(54) TECHNOLOGICAL MACHINERY FOR PRODUCTION OF POLARIZERS

(75) Inventor: Yuri A. Bobrov, Moscow (RU)

(73) Assignee: Nitto Denko Corporation, Osaka (JP)

( * ) Notice: Subject to any disclaimer, the term of this patent is extended or adjusted under 35 U.S.C. 154(b) by 109 days.

(21) Appl. No.: 09/844,030

(22) Filed: Apr. 26, 2001

(65) Prior Publication Data

US 2002/0005919 A1    Jan. 17, 2002

(51) Int. Cl.
*B05C 1/02* (2006.01)
*B05D 1/42* (2006.01)

(52) U.S. Cl. .................. 118/261; 118/262; 118/304; 118/500

(58) Field of Classification Search .............. 118/66, 118/108, 261, 262, 304, 500, 50, 123, 126, 118/302, 323, 679–681, 407, 410, 413; 427/162, 427/163.1, 163.3, 165; 156/99, 100; 349/187; 425/224, 375
See application file for complete search history.

(56) References Cited

U.S. PATENT DOCUMENTS

| | | | | |
|---|---|---|---|---|
| 3,015,989 A | * | 1/1962 | Delangre et al. | 359/489 |
| 3,235,631 A | * | 2/1966 | Shelanski | 264/1.35 |
| 3,941,901 A | * | 3/1976 | Harsch | 427/108 |
| 4,056,423 A | * | 11/1977 | Hughes | 156/356 |
| 4,797,301 A | * | 1/1989 | Ardley et al. | 427/8 |
| 5,231,525 A | | 7/1993 | Yuasa et al. | |
| 5,335,681 A | | 8/1994 | Schmid | |
| 5,739,296 A | | 4/1998 | Gvon et al. | |
| 5,755,881 A | * | 5/1998 | Fenoglio et al. | 118/50 |
| 6,432,201 B1 | * | 8/2002 | Klas et al. | 118/200 |
| 6,471,776 B1 | * | 10/2002 | Krossa et al. | 118/410 |
| 6,793,764 B1 | * | 9/2004 | Doan | 156/345.17 |

FOREIGN PATENT DOCUMENTS

| | | |
|---|---|---|
| RU | 2110818 | 5/1998 |
| RU | 2114884 | 7/1998 |
| WO | WO 94/28073 | 12/1994 |

OTHER PUBLICATIONS

Luft, B.D., et al., "Physico-chemical methods of treatment of semiconductors", *Radio I Svyaz'* (1982) p. 107.
Bobrov, Yuri A. et al., "Novel Dichroic Polarizing Materials and Approaches to Large-Area Processing", Materials Research Society, Symp. Proc. vol. 508 (1998), pp. 225-228.

* cited by examiner

*Primary Examiner*—Laura Edwards
(74) *Attorney, Agent, or Firm*—Dorsey & Whitney LLP

(57) ABSTRACT

The invention pertains to technological apparatus' for production of polarizers, obtained from lyotropic liquid crystals (LLC) based on organic compounds, in particular, dyes. The technological production line for polarizer formation comprises at least one system of formation of polarizer films from LLC of at least one organic compound, at least one system of local removal of the polarizer film material obtained from LLC of at least one organic compound, at least one substrate holder and at least one means of relative movement. Also introduced, an apparatus for formation of polarizer films from LLC of at least one organic compound and a system of localized removal of polarizer films obtained from LLC of at least one organic compound.

27 Claims, 6 Drawing Sheets

TECHNOLOGICAL MACHINERY FOR PRODUCTION OF POLARIZERS

RELATED APPLICATIONS

This application claims priority to Russian Application No. 2000117957 filed on Jul. 11, 2000.

BRIEF DESCRIPTION OF THE INVENTION

The invention pertains to technological machinery for production of polarizers obtained from lyotropic liquid crystals based on organic compounds, particularly dyes.

BACKGROUND OF THE INVENTION

There is a known polarizer, obtained on the basis of liquid-crystal solutions of organic dyes [1]. Polarizer, according to the herein technology, is obtained by application of thin film of liquid crystalline dye solution onto a glass or polymer substrate via one of the known methods. The distinction of this technology lies in that the orientation of the dye molecules occurs in the process of application of the film, so that a thin heat-resistant polarizing coating forms on the substrate immediately after drying. Such films could be used as polarizers in various optical devices. Their application allows creation of new designs of liquid-crystal displays, in which polarizers could form directly on the surface of liquid crystal cell, on the outside as well as on the inside.

Application of polarizers in displays bears certain peculiarities, related to their small thickness and hydroscopicity, as well as to the contemporary techniques of display manufacturing. Thus, for example, in case of external positioning of polarizers, they have to be protected by some means to prevent their mechanical damage. Moreover, the area, covered by the protective layer, should be larger than the area of the polarizer in order to completely avoid any contact of the polarizer with the surroundings and prevent penetration of moisture. In case of their placement inside the cell, polarizer should not be around the perimeter of the cell at the areas of adhering since it will compromise the quality of the adherence for once, and will contact with the surroundings, second. Therefore, polarizer should cover only the working area of the display and should not be at its peripherals. Taking into account that several displays are formed on a single substrate, a necessity to form a pattern on its surface arises. This could be performed by localized application of polarizer onto the substrate, or by the localized removal of the polarizing layer applied previously on the entire area of the substrate, preserving it on the proper regions of the substrate.

Various methods of application of the herein films and machinery allowing its implementation are known [2]. Application of LC solution could be implemented using slot, rod or roller. However, the known apparatuses do not allow obtaining polarizers with reproducible characteristics because of the difficulties of forming a uniform 15–10 μm thickness wet layer film without lines and with uniform orientation of molecules over the entire working field of the substrate. Besides that, these apparatuses do not allow obtaining polarizers with polarizing layer applied on separate regions of the substrate.

There are known methods of forming a pattern of polarizing films based on lyotropic liquid crystal (LLC) compounds [3]. According to [3], the film is formed by a cylindrical engraved roller, in which the engraving is implemented as grooves on the surface of the roller within the boundaries of the pattern. The grooves get filled with LLC solution, which subsequently is transferred onto the surface of the substrate via rolling the roller over it. This method has the disadvantage that due to the high viscosity of the LLC, a roller with the diameter of no larger than 3 cm can be used to ensure quality of application. Therefore it is difficult to form patterns with linear dimensions along the direction of application larger than 10 cm. Besides that, the use of this method strongly depends on viscosity of LLC and the thickness of the forming film. In particular, the degree of orientation of molecules in thick films appears to be substantially worse than in thin ones. Therefore, in order to form a pattern on a polarizer, it is favorable to apply a layer of polarizer on the entire area of the substrate and later locally remove it from a part of the area, leaving the proper configuration of the polarizer.

Various methods of removing thin isotropic films from the surface of a substrate are known, either through mechanical removal on separate areas or using protective mask via etching [4]. However, all of them have a number of substantial disadvantages, which limit their applicability for removal of polarizing layers. In particular, the mechanical method requires frequent replacement or cleaning of the removed material from the working element, and constant evacuation of the dust formed in the process of operation. The methods of local removal of polarizing layer via etching or rinsing with the use of protective mask are less productive and more expensive since they include several additional technological stages, related to formation of the protective mask. Besides that, the application of the protective mask onto the polarizing layer and its subsequent removal invariably leads to worsening of the polarizer's structure.

SUMMARY OF THE INVENTION

The invention is focused on the development of an apparatus for producing a uniform thickness and molecular orientation layer of polarizer made of LC solutions on the entire area of the substrate as well as only on the desired regions of it.

The technical result of the invention is the creation of an apparatus for producing polarizing film made of LLC based on organic compounds on the surface of the substrate. The declared apparatus will provide an enhancement of molecular orientation in the polarizing material, an enhancement of its optical anisotropy, and, as a consequence, an enhancement of polarizing effectiveness with the same thickness of the film, enhancement of the thickness uniformity over the area, broadening of the range of speeds of application, within the limits of which no defect lines will form on the polarizer.

The technical result of the invention also is the creation of an apparatus for localized, mask-free removal of separate regions of polarizing layer. The process and apparatus provides: the possibility of forming polarizers on the desired regions of the substrate, while retaining unchanged all the functional characteristics of the remaining polarizing layer and its periphery as well as the previously introduced elements of the device on the substrate; exclusion of contamination of the working area of the polarizers and the substrate by the removed material; preserving the structure of the film, formation of a straight edge of the polarizing layer without disturbing the orientation of molecules in the near-edge area; and preserving the structure and integrity of the polarizing film along the edges of the removed areas as well as over the entire working area of the polarizer.

Technical result of the invention also is the creation of an apparatus, which allows applying the polarizing film onto the substrate and locally remove it in the proper regions while maintaining the integrity and structure of the film in the desired areas. Moreover, local removal of the film's material can be performed at any degree of moisture content in the film, which allows combining the processes of drying and material removal, maintaining the optimum regime of drying during the whole cycle of formation of polarizer. This not only enhances productivity due to reduction of production operations, but also enhances the quality of created polarizers, especially on the edge since the process of crystallization during drying leads to additional orientation of molecules including the regions along the edge. Therefore, localized removal of the film material not only does not cause formation of a damaged edge, but also provides an opportunity to "heal" the edges of the remaining layer due to the process of additional crystallization.

The technical result of the invention is achieved by the fact that in the apparatus for forming polarizer(s) from lyotropic liquid crystal(s) based on at least one organic compound, comprises at least one system of application of LLC onto at least one substrate, and at least one system of orienting force on LLC and/or on the molecules and/or on the supra-molecular complexes of the organic matter(s). The systems are installed with the possibility of relative movement with at least one substrate holder, at least one system of orienting force comprises at least one plate, one end of which is fixed so that upon relative movement of the plate and the substrate holder(s) at least a part of the plate surface freely translates over the surface of the applied film(s) providing the external orienting force on LLC and/or on the molecules and/or on the supra-molecular complexes of the organic matter(s).

In the above apparatus, at least one system of application can comprise at least one method of supplying LLC. At least one method of supplying LLC can involve at least one injector for supplying LLC, and/or at least one system of transmission rollers, and/or at least one channel with a metering dispenser. At least one system of application can comprise at least one element for application of LLC onto the substrate(s) implemented as at least one rotating roller and/or as at least one fixed roller and/or at least one slot and/or as at least one rod. On the surface of at least one roller there can be introduced a relief (a pattern). At least a part of the plate(s) surface can possess hydrophilic and/or hydrophobic qualities. On at least a part of the plate's (s') surface there can be introduced a relief (pattern). Plate(s) can be made out of polymer materials or rubber, or at least two different materials, comprising separate parts of the plate(s) and/or comprising layers of plate(s). At least one system of application can be installed with the possibility of vertical movement relative to the substrate holder(s). At least one system of application can be installed with the possibility of horizontal movement relative to the substrate holder(s). One end of the plate(s) can be fixed on one or different holders with the system(s) of application or directly on at least one system of application. At least one system of application can be implemented as at least one fixed roller(s), which is installed with the possibility of movement to provide clasping of the plate(s) to the forming film(s). At least one system of orienting force can be additionally supplied with at least one means of clasping the plate(s) to the forming film. The plate(s) can be implemented in a rectangular shape. The apparatus can be additionally supplied with at least one anti-vibration system and/or a system of automatic control and/or control of the formation process.

Technical result is achieved also by the fact that in the apparatus of localized removal of the material of the polarizing film(s), obtained from LLC of at least one organic compound, at least one system of the solvent(s) supply is implemented as at least one directing channel, at least one system of solvent and/or products of reaction(s) and/or solution(s) removal implemented as at least one directing channel and installed with the possibility of connection to a system of discharging and/or vacuum system. Technical result is also achieved by the fact that in the apparatus, the system(s) of supply and the system(s) of removal can be installed so that their longitudinal axes are situated perpendicular to the plane of at least one substrate holder. System(s) of supply and system(s) of removal can be implemented with the possibility of vertical and/or horizontal movement. System(s) of supply and system(s) of removal on one hand and substrate holder on the other can be implemented with the possibility of relative movement. System(s) of supply and system(s) of removal can be installed fixed relative to each other or with the possibility of relative movement. System(s) of supply and system(s) of removal can be implemented as coaxial tubes where the inner diameter of the removal tube(s) is greater than the inner diameter of the solution(s') supply tube. System(s) of supply and system(s) of removal can be situated at a fixed distance from each other. The apparatus can be additionally supplied with a system of automatic control and/or control over the process of localized removal. The apparatus can be additionally supplied with at least one anti-vibration system.

Technical result of the invention is achieved due to the fact that the technological line of polarizer formation comprises at least one apparatus for formation of polarizing film(s) from LLC of at least one organic compound, at least one apparatus of localized removal of the polarizing film material obtained from LLC of at least one organic compound, at least one substrate holder and at least one means of their relative movement. Technical result of the invention is also achieved due to the fact that at least one apparatus for film formation in the technological line and the at least one apparatus of localized removal can be implemented according to the claims. At least one apparatus for formation of film(s) and at least one apparatus for localized removal and at least one substrate holder can be situated on one or separate bases. Technological line can be placed in a chamber or implemented in a single casing. Technological line can be additionally equipped with at least one manipulator for transfer and/or transportation of products. Technological line can additionally comprise at least one table for between-operation transfer and/or storing. Technological line can additionally be equipped with at least one means of drying, installed within at least one apparatus of the line, and/or between the apparatuses of the line, and/or in front of at least one apparatus for forming, and/or after at least one apparatus for localized removal, and/or above and/or below at least one substrate holder. At least one means of drying can be implemented as a heater or a system of air blowing or as a radiation system. Technological line can additionally comprise at least one anti-vibration means. Technological line can be additionally equipped with means of automatic control of the process and/or a system for control over the process.

The introduced technological apparatus can be built into a technological production line for manufacturing LC displays. The place of installment of this system into a production line will be determined by the place of application of polarizers and related to its subsequent operations and will depend on whether polarizers are to be outside of the cell or inside. Here, the apparatus for application of polarizing coatings is implemented analogously as for the external as for the internal polarizers.

The key moment in the technology of formation of polarizing coatings from liquid-crystal solutions of organic matters is the fact that the orientation of the major axes of the molecular complexes, which are the structural and kinetic units in such solutions, in the volume of a liquid film coincides with the direction of the velocity vector of the liquid flow in the region of film formation. Therefore, any non-homogeneity of the velocity vector distribution throughout the volume of the liquid will lead to a non-homogeneities in the polarizing layer after its drying. Therefore, a major requirement to the apparatus for formation of the polarizer is that the system must provide uniform orientation of molecules throughout the volume of the film of LC solution in the process of application and its uniform thickness. Moreover, the thickness of the wet layer should be within the range 5–10 μm.

To introduce the orientation of molecules, the method of application should provide shear or tension in the layer of the liquid, which immediately limits the number of methods of film application to the roller, rod, and slot methods.

The major condition for creation of a uniform molecular orientation in the layer of LC solution is the formation of a laminar, uniformly oriented flow of liquid in the gap between the surface of the substrate and the working element of the application system, and also rectilinearity of the line of detachment of the liquid from the working element of the application system at the exit from the region of film formation. Non-Newtonian rheological qualities of LC solution, high effective viscosity, which changes depending on the shearing speed and temperature from 1.5 to 0.5 Pa*s, and the high surface tension around 70 dyne/cm (dyne is a unit of force, $10^{-5}$ newton), substantially hinder creation of such conditions. Upon application of liquids with such qualities in thin film, the lines of different thickness and molecular orientation easily appear.

Taking into account that the thickness of the wet film is within 10 μm, special requirements are placed on the vibrational characteristics of the apparatus. Oscillations of the applying system along any direction will modulate the thickness of the film as well as the instantaneous distribution of the velocity vector in the liquid. Thus, for example, oscillations of the rod perpendicular to the plane of the plate will modulate the thickness of the film. Moreover, the instantaneous distribution of the liquid velocity vector will also be modulated and, as a consequence, so will be the local direction of the polarizing axes. Oscillations of the application system or the table in the horizontal plane, perpendicularly to the direction of application of the film, will modulate the direction of the cumulative velocity vector and, consequently, the direction of molecular orientation in the plane of the plate. Such oscillations can substantially affect the polarizing effectiveness of the obtained film. All this indicates that the requirements to the uniformity of movement of the application system or the table and to the absence of vibrations must be very high.

Therefore, determined in short, the following are the major features of formation of polarizers based on liquid-crystal solutions:

1. Small thickness of the formed wet layer of LLC (<10 μm)

2. High effective viscosity of LLC (~0.3 Pa*s)

3. Low level of vibrations (<1 μm perpendicular to the plane of the substrate)

4. High uniformity of movement of the application system and the table.

BRIEF DESCRIPTION OF THE DRAWINGS

The essence of the invention is explained in FIGS. 1 through 6.

DETAILED DESCRIPTION

Figure 1:
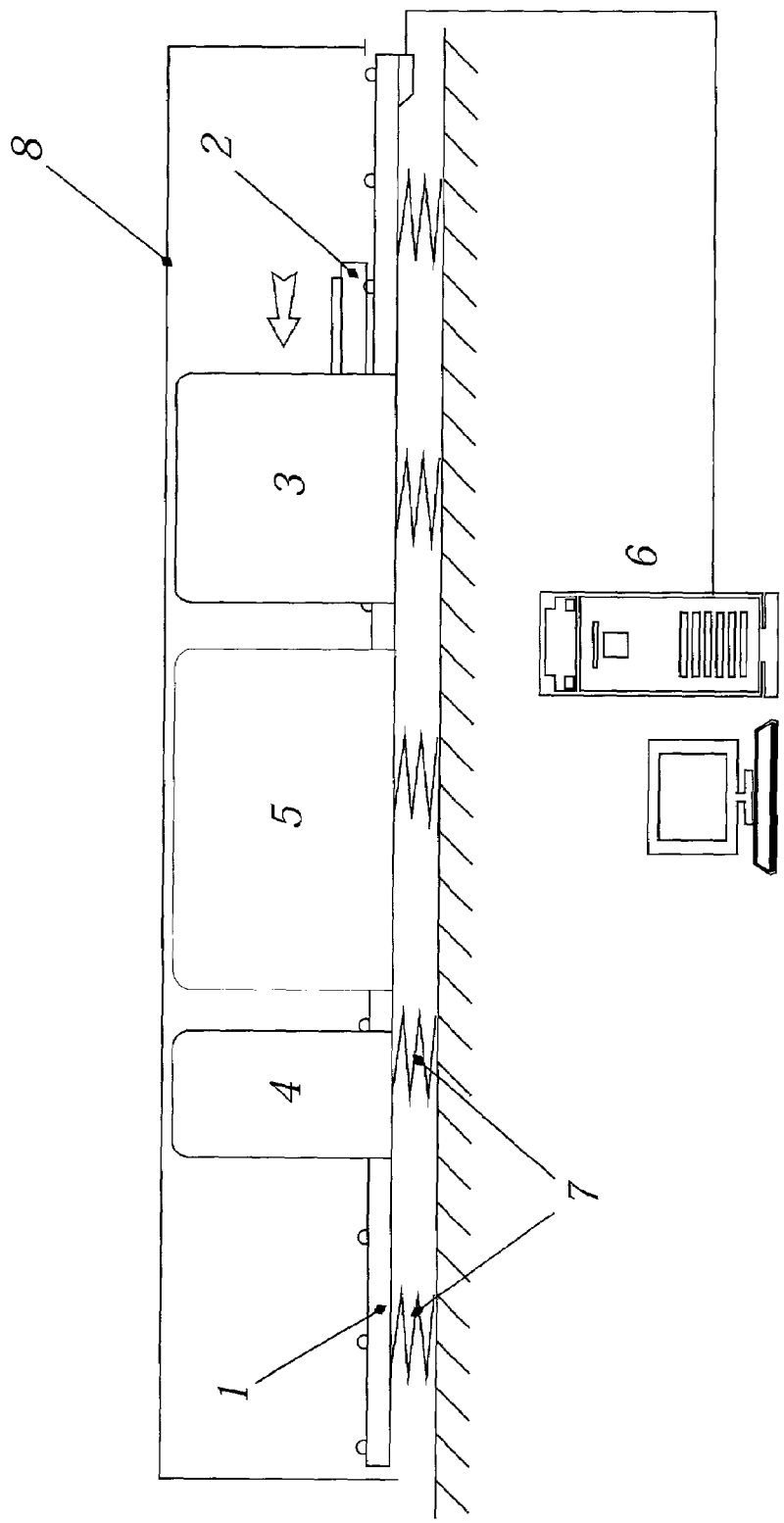
FIG. 1 illustrates the general schematic of the technological line for formation of polarizers from a liquid-crystal solution.

The major parts of the apparatus for application of polarizing coating (FIG. 1) are: the stand 1 (the base), on which all the working systems are situated, table 2 (substrate holder) for substrate placement, the system of polarizing film formation 3, the system of localized removal of the polarizing film material 4, the system of zonal drying 5, means of the relative mechanical movement of the table on the stand (not shown), the control block 6, anti-vibration system 7, the means to protect the working area from dust 8. Additionally to that, the apparatus can comprise a system of automatic supply onto the table and removal from it of the working substrates, the LLC and the working area temperature stabilizer, as well as any other systems and mechanisms providing automatic processing of substrates, enhancing the quality of polarizers or productivity of the apparatus. In FIG. 1, the system of zonal drying is situated between the system of formation and the system of local removal, and provides optimum moisture of the polarizing layer at removal. However, the system of local removal of polarizing layer can be situated directly after the application system or on it, removing the wet film of LLC off the substrate in the required places.

Depending on the construction of the display, as a rule, a certain orientation of the polarizing film's polarization axis relative to other elements' optical axes is necessary. This makes it necessary to apply the polarizer at an angle to the sides of a rectangular substrate other than 0° and 90°. Therefore, the table for substrate placement can have means for horizontal turning of its plane relative to the direction of movement.

The major operations, which are performed by the apparatus, are the preliminary application of the LLC solution onto the substrate, its distribution over the surface into a thin oriented layer, additional orientation, change of substrate orientation to a desired angle, local removal of the polarizing film material, turning of the substrate to 90°, and second local removal of polarizing film material. Depending on the angle of orientation of the sides of the substrate relative to the direction of movement, and also on the method of application of polarizer, some operations can be eliminated or be performed simultaneously. In a more general case, when the substrate is oriented arbitrary, application of polarizing film is performed in two stages: formation of continuous layer over the entire surface of the working substrate (which further could be used as one of the plates in a display) and removal of the polarizer from the part of the surface preserving it only in the desired places. The sequence of operations in the apparatus shown in FIG. 1 is as follows. The substrate is situated on the table 2, and LLC is applied on it. Upon movement of the substrate, the polarizing coating is formed, and, if it is necessary, additional orientation is performed. After the substrate exits the system of application, it is rotated from the position in which two its sides were oriented at an angle to the direction of movement, to a position where those sides are oriented parallel to the direction of movement. Upon further movement, the substrate enters the zone of operation by apparatus 4, of local removal of the material of the polarizing film, and the film is removed from the substrate in the desired places. Reaching the end of the apparatus, the table turns to 90° and moves backwards. Here, the removal of the polarizer happens in the direction perpendicular to the direction of the first removal. The table moves to the initial position where the processed substrate is replaced by a new one. In case when the removal system is situated directly in the system of film application, the apparatus is more compact (has smaller size), since maximum travel distance of the substrate is limited only by the dimension of the substrate's diagonal, whereas in the previous case this distance has to be twice more. However, in this configuration, the substrate has to travel two cycles of movement to fully complete the process of polarizer formation: formation of the continuous film upon movement from left to right, first local removal of polarizer upon the reverse movement, the second removal upon the second cycle of movement from left to right and an idle movement to return the substrate to the initial position.

To increase productivity, the apparatus can have such table size, that several substrates could be placed on it. Here the apparatus can have corresponding number of application and removal systems so that polarizers are formed simultaneously and independently on each substrate.

Figure 2:
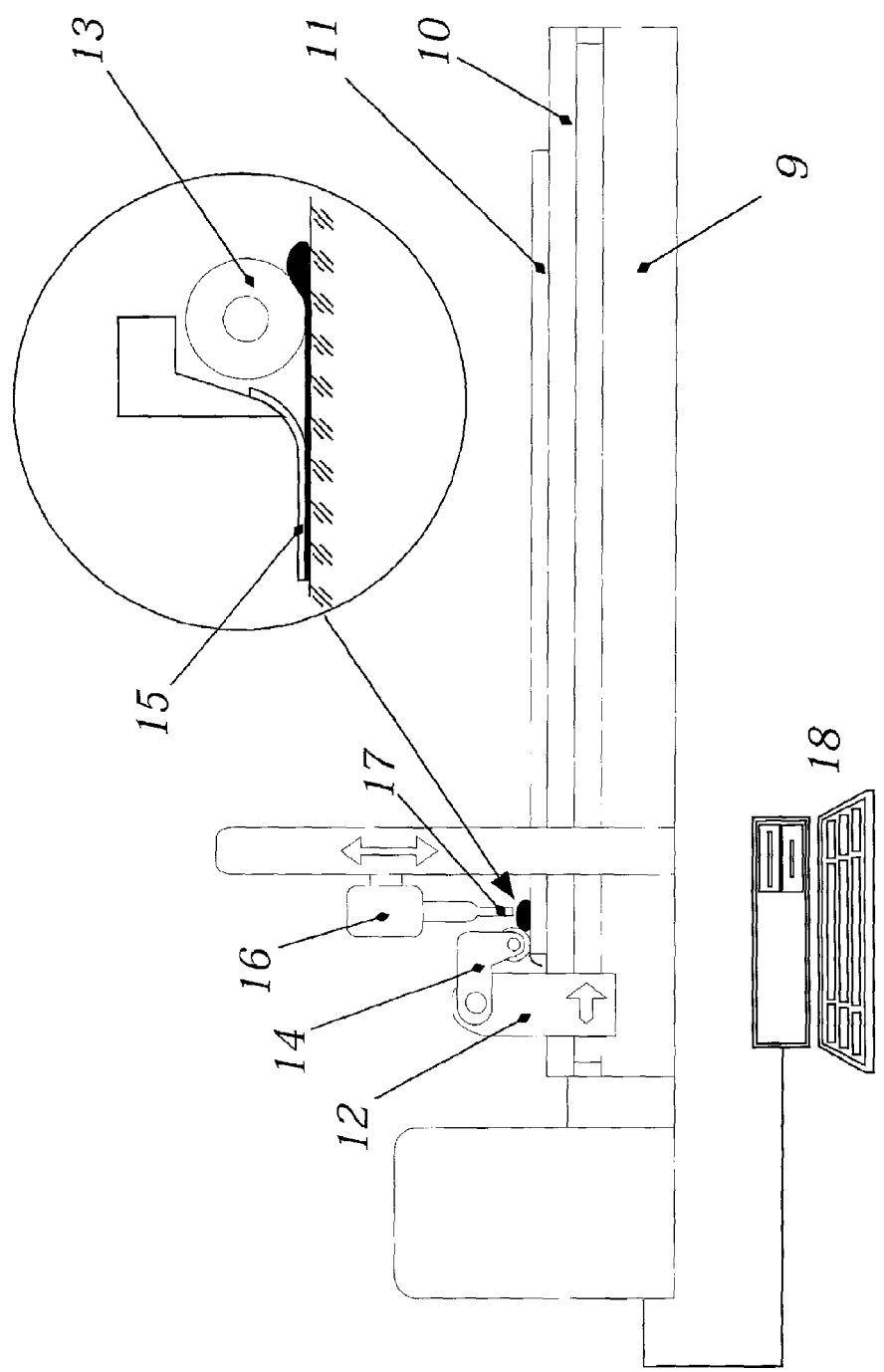
FIG. 2 illustrates the apparatus for formation of polarizing films.

FIG. 2 illustrates the system for application of the polarizer, in which the working element, creating the oriented film of the polarizer, is a rod. The major elements of the system are the stage 9, on which the table 10, equipped with the vacuum fastener of the working substrate and the system of transportation of the carriage 12 are situated. The table should be equipped with braces for precise placement of the substrate. Carriage 12 serves to have the rod 13 mounted on it using holder 14. The rod holder must provide its easy installment, rigid fixture and adjustable uniform clasping of the surface of the substrate along its entire length. Besides that, the holder can have element 15 fixed on it, which provides additional orienting force on the film of LLC.

The stage 9 also has system 16 situated on it, which is used for application of LLC onto the substrate in the form of a line along the entire length of the rod. The system 16 for LLC application represents a reservoir with LLC, from which LLC is supplied at a required pressure onto the surface of the substrate via a tube through a calibrated needle-like tip 17. The tip can travel with the required speed across the substrate along its entire width. Control over the apparatus is performed from the control desk 18.

The stage of the apparatus is placed on a table with anti-vibration protection.

Operation of the apparatus is performed in the following sequence. Initially the carriage is situated at the far left position so that the rod 13 is beyond the boundaries of the substrate 11 and propped up above it. At this time the tip 17 of the system 16 for application of LLC, through which the later is supplied onto the substrate, is situated at the edge of the substrate in the upper position. At the start of the operation the tip is lowered to a desired height, the solution under pressure is feed into the channel of the tip and, when the solution starts to pour onto the surface of the substrate the tip starts to move across it with the desired speed. The quantity of the applied material will be determined by the pressure and the speed of movement of the tip. Upon reaching the edge position the tip is lifted and returned to the initial position. The carriage starts to move and when it reaches the edge of the substrate, the rod is lowered and starts to spread the solution over the surface of the substrate with the desired speed. During that, the element 15 produces additional orienting affect on the wet film, removing disturbances in the molecular orientation, induced at the phase of application of the polarizing film by the rod. Reaching the extreme left position, the carriage stops. During that, the rod is lifted and the carriage is returned back to the initial position.

In the capacity of the rod a so-called Mayer rod can be used, which represents a metal bar with a calibrated wire of circular cross section reeled tightly on it. Such rod allows obtaining films of the necessary thickness and high degree of uniformity. The orientation of molecules at the same time has some function of distribution induced by the periodical structure of the rod's surface. Such orientational distribution of molecules worsens polarizing characteristics, which is especially noticeable in thick films. Introduction of the additional orienting element 15 allows eliminating this drawback, making orientational distribution of molecules more uniform.

The element for additional orienting element 15 represents a flexible thin plate (or a film) of an organic material having smooth and even surface. During application of the polarizing coating the plate touches the surface of LLC and slides over it creating the additional, uniform over the entire width of the substrate, orienting force on the molecules of LLC due to the surface tension forces. The length of the plate in contact with the film of the LLC is selected so as to achieve the best orientation of molecules and lies in the range of 1 to 500 mm.

Figure 3:
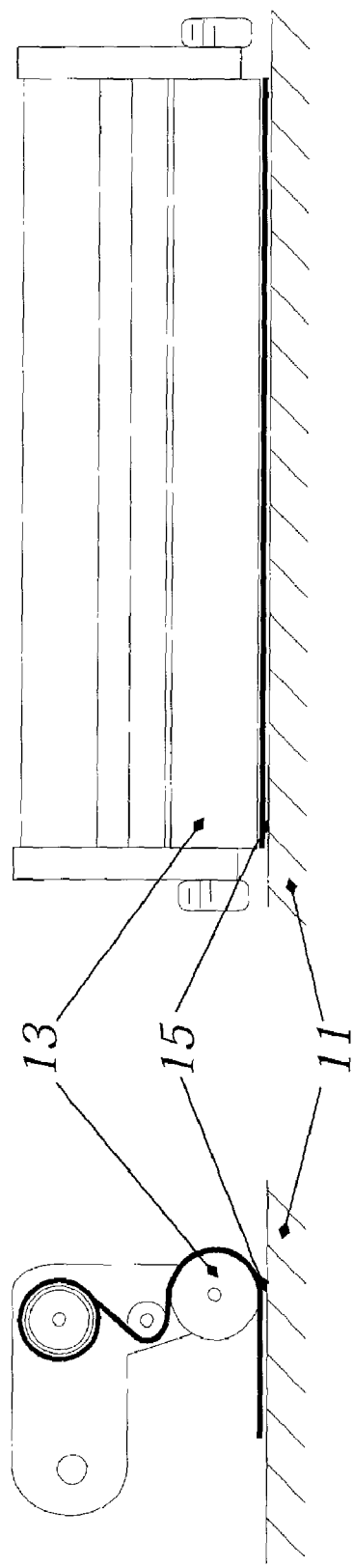
FIG. 3 illustrates the method of mounting the orienting system.

Various methods can be used for attachment of the element 15 relative to the rod in the apparatus. FIG. 3 illustrates placement of the element 15 between the rod 13 and the substrate 11. In this case it is especially convenient to use the roller with an elastic coating in the capacity of the rod since it allows eliminating non-homogeneity of the polarizing film's thickness introduced by the disturbances in the surface of the substrate 11. This is especially important during application onto substrates of large size where it is difficult to provide uniform clasping of the rod to the surface of the substrate 11 due to the unavoidable curvatures of the substrate itself as well as the axis of the rod. The thickness of the layer of polarizer then will be determined by the elasticity of the rod's elastic coating, the speed of the rod's movement, viscosity LLC and the force of pressing the rod to the substrate.

Figure 4:
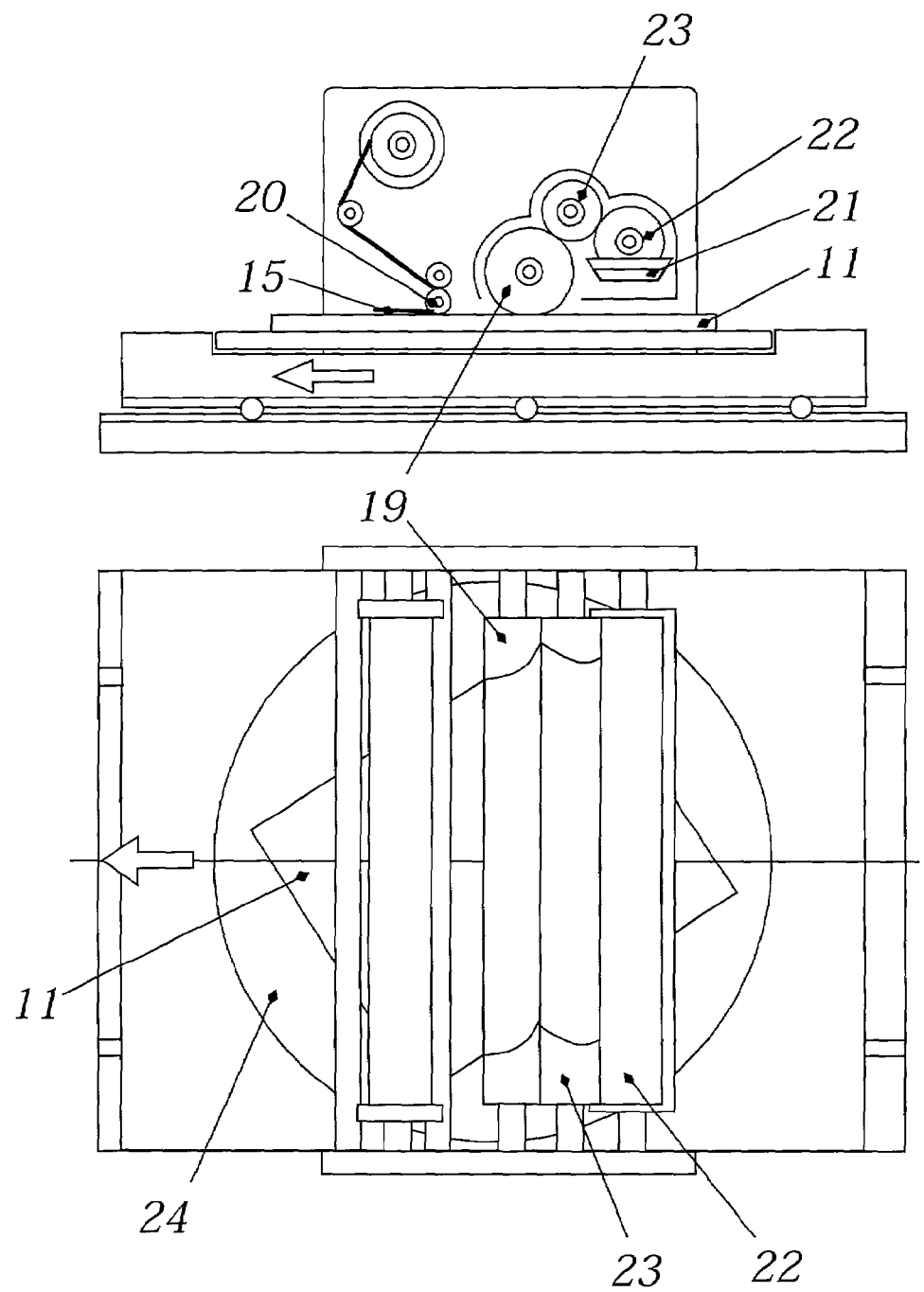
FIG. 4 illustrates the apparatus for formation of polarizing films at a certain angle to the edges of the substrate.

FIG. 4 illustrates an apparatus for application of polarizing coating in the case when the optical axis of polarization should make a certain angle (from 0° to 90°) with the edges of the display. Formation of polarizing coating happens in two stages. First, application roller 19 applies a layer of dye onto substrate 11, then the dye is distributed into a layer of required thickness and oriented by the polymer plate 15, which is pressed against the substrate by the elastic roller 20. The dye 21 is captured by the roller 22 and transmitted onto the mantle roller 23, the surface of which has a deepening so that the protruding part has a reaming in the shape of the substrate. The dye, on the protruding part will be transmitted onto the application roller 19 and further onto the substrate 11. The substrate is fixed on the rotating table 24 with vacuum fastening. Application and orientation of the film happens during movement of the table. After the substrate travels outside the boundaries of the application system, the table is rotated to a certain angle so that two sides of the substrate are parallel to the movement of the table. Then the table travels further and the substrate enters the apparatus for removing polarizer in the necessary regions.

Figure 5B:
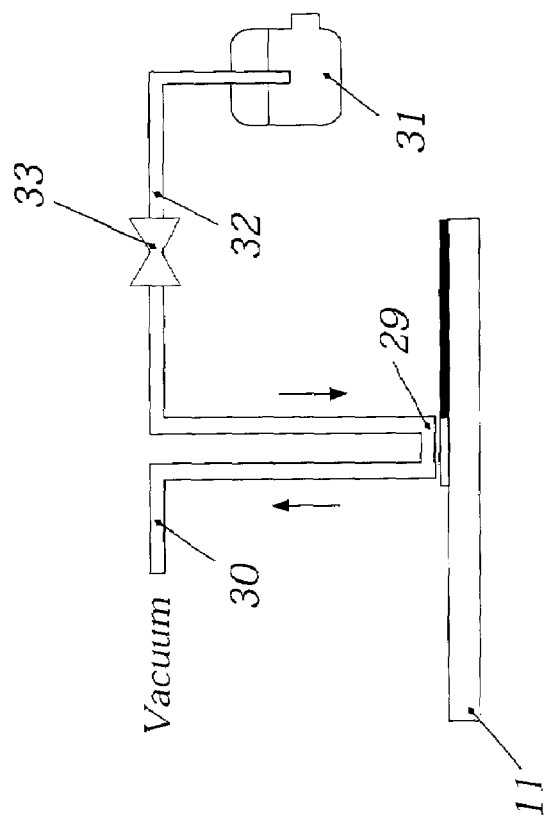
FIGS. 5a and 5b illustrate apparatus for localized removal of the polarizing film material.
Figure 5A:
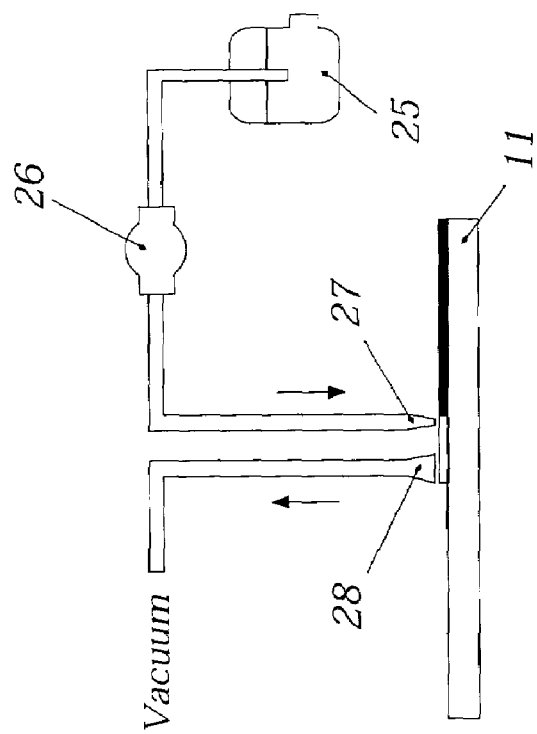

FIG. 5 illustrates two examples of implementation of an apparatus for localized removal of the material of the polarizing film, based on one principle: diluting the film with water in the required region and its removal with a vacuum pumping. The difference lies only in the method used to create the excess pressure of water during its feeding to the required region of the substrate. In the system shown in FIG. 5a the water is feed under pressure created via various methods; in the second system shown in FIG. 5b the pressure in the water is introduced by the rarefication created by the vacuum suction.

In the apparatus shown in FIG. 5a the water from reservoir 25 is feed into the tube 27 via pump 26, it then dilutes the film of the dye and is removed by a vacuum pump through tube 28.

In the apparatus shown in FIG. 5b there is one channel, open from the side of the substrate 11. During the approach of the apparatus to the substrate, a lower pressure is created in the tube 30, the water is sucked from the reservoir 31 into the channel 29, it then dilutes the film of the dye and is removed through the tube 30. Valve 33 controls the water consumption.

Figure 6:
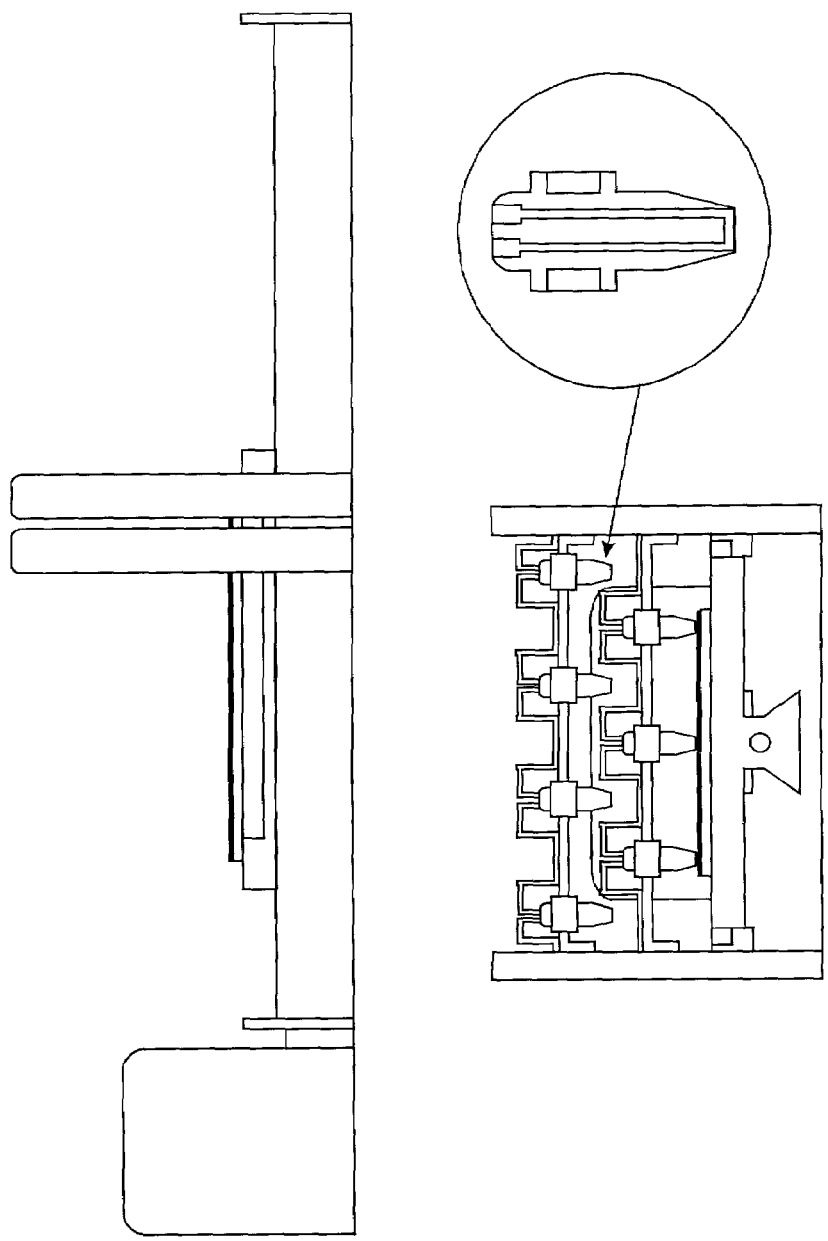
FIG. 6 illustrates the apparatus comprising a group of systems for local removal of the polarizing material.

Independently from the method of creation of the excess pressure in the water such working elements can be grouped into a complex of elements (FIG. 6). In this case they will work simultaneously and remove regions of a film or films of polarizers by strips. It would be convenient to install two groups of such elements in the apparatus for application, one of which will be operating during the forward movement of the table and the other during backward movement. The distance between the elements in one group would then correspond to the width, while in the other to the length of the displays.

In both cases, the proposed apparatus allows removing the polarizing film independently of its moisture content. The optimum moisture content of the film is picked with the condition of high rate of removal and maintaining sharp edge and high degree of orientation in the boundary region.

The condition of implementation feasibility of such method of polarizer removal is determined by the rate of dilution of the polarizing material and the rate of removal of the created solution in comparison to the rate of application of the polarizing layer. The rate of application depending on the viscosity of LLC solution can be from 5 to 200 mm/second. For this range of rates and the distance between the water feeding and vacuum pumping channels of 1 cm, the time of contact between the water and the polarizer is between 2 and 0.05 second. As shown by experiment, controlling the rate of the water feed and solution vacuuming, it is possible to achieve complete removal of a dry polarizing film of about 1 μm thick, which proves technical feasibility of the herein method of localized removal of polarizing coating.

Conducted research had confirmed the high quality of the obtained polarizers, high degree of anisotropy and high polarizing effectiveness. During localized removal of the polarizing material the edges and the surface of the remained regions had perfect structure and the regions themselves had uniform thickness over their area. Investigations showed that the listed above technical results for each of the apparatus' were achieved.

REFERENCES CITED

[1] WO 94/28073, Dec. 8, 1994
[2] RU 21148884, Oct. 7, 1998
[3] RU 2110818, Oct. 5, 1998
[4] "Physico-chemical methods of surface processing of semiconductors", ed. Luft B. D., M.:, Radio and connection, 1982, p. 107

What is claimed is:

1. Apparatus for formation of polarizers from a lyotropic liquid crystal (LLC) of at least one organic compound comprising:
   at least one system for applying the LLC onto at least one substrate supported on a substrate holder,
   at least one system for applying orienting force on the LLC,
   a moving means for moving said systems for applying the LLC and for applying orienting force relative to said substrate holder, and
   at least one anti-vibration means for preventing vibration of the apparatus,
   wherein said at least one system for applying orienting force comprises at least one plate, one end of which is fixed such that during relative movement of the plate and the substrate holder at least a part of the plate's surface travels unrestricted over the surface of the applied LLC providing an external orienting force on the LLC.

2. Apparatus according to claim 1 wherein said at least one system for applying the LLC includes means for feeding the LLC onto the substrate.

3. Apparatus according to claim 2 wherein said means for feeding the LLC comprises at least one injector.

4. Apparatus as in claim 2 wherein said means for feeding the LLC comprises at least one roller.

5. Apparatus as in claim 2 which comprises at least one channel with metering dispenser.

6. Apparatus according any of claims 1–3 wherein said at least one system for applying the LLC comprises at least one element for applying the LLC onto the substrate and at least one roller.

7. Apparatus as in claim 2 in which said at least one system for applying the LLC onto the substrate comprises at least one doctor blade or rod.

8. Apparatus according to claim 6 wherein on the surface of the at least one roller there is a relief pattern.

9. Apparatus according to any of claims 1, 2, or 7 wherein at least a part of the surface of the plate possesses hydrophilic or hydrophobic qualities.

10. Apparatus according to any of claims 1, 2, or 7 wherein at least on a part of the surface of the plate there is a relief pattern.

11. Apparatus according to any of claims 1, 2, or 7 wherein the plate is made out of a polymer material or rubber or at least two different materials.

12. Apparatus according to claim 2 wherein said at least one system for applying the LLC is vertically moveable relative to the substrate holder.

13. Apparatus according to claim 2 wherein said at least one system for applying the LLC is horizontally moveable relative to the substrate holder.

14. Apparatus according to claim 1 wherein said at least one system for applying the LLC is implemented as at least one fixed roller, which is moveable to force the plate to the LLC.

15. Apparatus according to claim 1 wherein the plate is implemented in a rectangular shape.

16. Apparatus according to claim 1 further comprising a system of automatic control.

17. The apparatus according to claim 1 wherein one end of the plate is fastened to the at least one system for applying the LLC.

18. The apparatus according to claim 1 wherein the at least one system for applying the LLC is implemented as at least one fixed roller, which is moveable to provide clasping of the plate to the LLC.

19. The apparatus according to claim 1 wherein the at least one system for applying orienting force is provided with at least one means of clasping of the plate to the LLC.

20. Apparatus according to claim 1 further comprising:
   at least one system of feeding a solvent of the LLC, implemented in at least one directing channel, and
   at least one discharging and/or vacuum system for removal of the solvent and dissolved LLC.

21. Apparatus according to claim 20 wherein the system of feeding and the system of removal are installed so that their longitudinal axes are situated in the direction perpendicular to the plane of the substrate holder.

22. Apparatus according to claim 20 or 21 wherein the system of feeding and the system of removal are vertically and/or horizontally moveable.

23. Apparatus according to claim 20 wherein the system of feeding and the system of removal are moveable relative to the substrate holder.

24. Apparatus according to claim 20 wherein the system of feeding and the system of removal are moveable with respect to one another.

25. Apparatus according to claim 20 wherein the system of feeding and the system of removal comprise coaxial tubes, and the inner diameter of the tube for removal is larger than the inner diameter of the tube for feeding of solvent.

26. Apparatus according to claim 20 wherein the system of feeding and the system of removal are mounted at a fixed distance from each other.

27. The apparatus according to claim 1, wherein the at least one anti-vibration means prevents vibrations of the apparatus such that a thickness of a wet film of the LLC oriented by the at least one system for applying the orienting force is within the range of from 5 µm to 10 µm.

* * * * *